(12) United States Patent
Liu et al.

(10) Patent No.: US 7,669,187 B2
(45) Date of Patent: Feb. 23, 2010

(54) PLUGGABLE DEBUGGING INTERFACE FOR GRAPHICAL NOTATION DIAGRAMS

(75) Inventors: Peter Tehchuan Liu, San Ramon, CA (US); Matthew T. Stevens, Malvern, PA (US); Michael C. Frisino, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 875 days.

(21) Appl. No.: 11/387,225

(22) Filed: Mar. 22, 2006

(65) Prior Publication Data

US 2007/0260929 A1    Nov. 8, 2007

(51) Int. Cl.
    *G06F 9/44* (2006.01)
(52) U.S. Cl. ..................... 717/124; 712/227
(58) Field of Classification Search .......... 717/124; 712/227
    See application file for complete search history.

(56) References Cited

U.S. PATENT DOCUMENTS 7,472,378 B2 * 12/2008 Bennett et al. ............. 717/129
2005/0210455 A1 * 9/2005 Koehler et al. ............. 717/136
2006/0161272 A1 * 7/2006 Haller et al. ................. 700/29
2006/0259289 A1 * 11/2006 Shia ........................... 703/12
2007/0168997 A1 * 7/2007 Tran ........................... 717/129

OTHER PUBLICATIONS

Ouyang et al., "From BPMN Process Models to BPEL Web Services", Sep. 18-Sep. 22, 2006, IEEE International Conference on Web Services (ICWS'06), pp. 285-292.*

* cited by examiner

*Primary Examiner*—Wei Y Zhen
*Assistant Examiner*—Chih-Ching Chow
(74) *Attorney, Agent, or Firm*—Osha • Liang LLP (57) ABSTRACT

A low-level process, which was mapped from a high-level graphical notation diagram, is debugged using the high-level graphical notation diagram. To debug the low-level process, a debugging interface allows a user to set and track breakpoints and other debug events from the high-level graphical notation diagram. When a breakpoint or other debug event is encountered during low-level processing, the high-level graphical notation diagram is updated to show the status of the low-level process.

16 Claims, 3 Drawing Sheets

PLUGGABLE DEBUGGING INTERFACE FOR GRAPHICAL NOTATION DIAGRAMS

BACKGROUND

High-level graphical notation diagrams show a view of low-level processes at an abstract, easy-to-read level. Numerous high-level graphical notation diagram specifications have been created to facilitate the design and implementation of low-level processes. For example, graphical notation diagrams have been developed to model business workflows, biological and genetic information, mathematical algorithms, database designs, language analysis, and a number of other subjects. Graphical notation diagrams generally consist of simple visual elements, such as shapes, arrows, lines, and other graphical objects, that represent specific functions or features in a model. For example, a biological graphical notation diagram may be used to visually illustrate the biochemical reaction of a protein molecule in a biological network. In such a diagram, visual objects (e.g., rectangles) represent the protein molecule in various stages during the reaction process. In addition, arrows illustrate the flow of the reactions as they occur to the molecule.

A specific example of a high-level graphical notation diagram specification is the Business Process Modeling Notation (BPMN) specification. The BPMN specification provides techniques to graphically describe business processes in a visual way. BPMN is used to create high-level abstracted views of Business Process Execution Language (BPEL) processes. A BPEL process defines at a low-level the flow of information and services provided in a business transaction.

The BPEL specification allows users to define XML-based grammars that integrate web services from multiple sources. By defining a BPEL process, users may achieve web services interoperability without modifying the services themselves. For example, a BPEL process may be defined to integrate a multi-party transaction between an online store, a credit card company, and a shipping company. In this example, a user browses the online store, selects an item for purchase, and provides credit card information to the online store. When the user submits the credit card information, the BPEL process coordinates the flow of information from the online store to the credit card company. The credit card company verifies the user's identity, that the user has sufficient funds, etc. and returns a result. Again, the BPEL process ensures that the result is returned to the online store. If the transaction is approved, the BPEL process then coordinates the online store's interaction with the shipping company.

The BPEL process coordinates the interaction between parties using lower-level code. However, often the people designing the flow of a business process are not sophisticated programmers. For them, the low-level code is difficult to read and debug. Accordingly, BPMN was designed to visually abstract the low-level BPEL processes. BPMN provides a high-level graphical notation that visually illustrates low-level BPEL processes as workflow diagrams. The graphical nature of BPMN makes it easier for users and process developers to understand the flow of information and services provided in a business process.

Although BPMN and other graphical notation techniques improve methods for defining the interaction of entities in a process, there are no adequate tools or techniques for debugging at a high-level the underlying low-level code and its interaction with the high-level diagram. For example, existing debugging interfaces allow users to debug code at a fairly abstract level. However, they do not know how to interpret the graphical objects and visual elements found in current high-level graphical diagram notation techniques. Basically, existing debugging interfaces cannot show at the diagram level its interaction with the underlying low-level code.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In accordance with one embodiment of the present invention, there is provided an approach for debugging, at a high-level, a low-level process associated with a graphical notation diagram. For example, the approach debugs a BPEL process through a BPMN diagram.

In one embodiment, one or more high-level debug events may be set on one or more graphical elements in the graphical notation diagram. Each graphical element, which for example may be a shape, arrow, line, or other graphical object, represents a specific function or feature in the low-level process associated with the graphical notation diagram. Each graphical element may be assigned its own debug event, such as a breakpoint.

In one embodiment, the graphical notation diagram, including any set debug events, is converted into low-level process instructions that include low-level debug events corresponding to those set on the high-level graphical notation diagram.

Given the low-level process instructions, a mechanism may be initiated to debug it. By initiating the debug mechanism, in one embodiment, the graphical notation diagram is evaluated to identify the debug events set on the one or more graphical elements. From those debug events, a series of event requests are generated. In one embodiment, each event request corresponds to a debug event set on a graphical element. Alternatively, each graphical element is assigned a default debug event called step event so users may step through each element of the graphical notation diagram.

In one embodiment, there is a mechanism that detects when a low-level debug event is output from a low-level process. The detected low-level debug event is compared to the set of pending event requests to see if there is a match. If there is, the graphical notation diagram is updated.

In one embodiment, the process of updating the graphical notation diagram includes changing the appearance of a graphical element in the graphical notation diagram. This can include highlighting the graphical element, displaying current state information for the graphical element, displaying a set of instructions from the low-level process, or performing some other type of update of the graphical notation diagram.

Thus, if there are bugs in the low-level process, with this approach, it is possible to identify and debug them simply and efficiently.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

System Overview

Techniques allow a running low-level process to be debugged using a high-level graphical notation diagram from which the process is mapped. To debug the low-level process associated with the high-level diagram, in one implementation, high-level techniques are used to launch a debugging tool to track the underlying low-level process as the low-level process executes.

Figure 1:
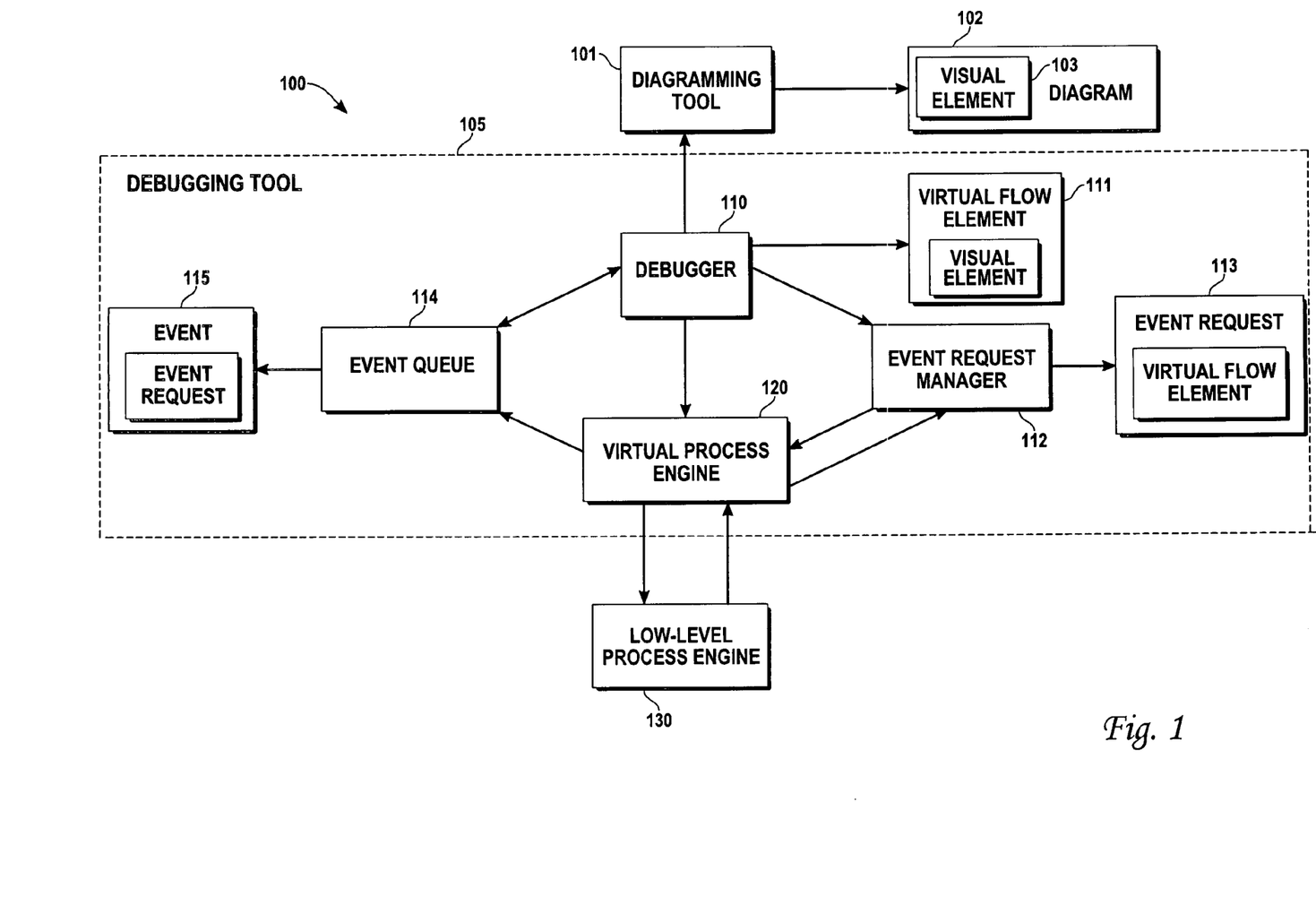
FIG. 1 illustrates a block diagram of an example framework for testing and debugging at an abstract level the high-level graphical notation diagrams as they interact with low-level processes.

FIG. 1 illustrates an exemplary framework 100 for debugging a low-level process associated with a high-level graphical notation diagram. To debug the process, three separate tools are illustrated in FIG. 1: a graphical diagramming tool 101, a debugging tool 105, and a low-level process engine 130.

The diagramming tool 101 is a software tool that allows a user to design and create high-level representations of low-level processes. The high-level representations are graphical notation diagrams 102. A diagram 102 typically includes visual elements 103 that represent the flow of information through a process. In one implementation, diagram 102 conforms to the BPMN specification.

The debugging tool 105 interfaces with the diagramming tool 101 to provide tools and commands to debug the low-level process represented by diagram 102. For example, in one implementation, the debugging tool 105 extends the basic command set that the diagramming tool 101 implements. The extended command set allows users to insert debug information into the diagram 102 and to evaluate the low-level process in conjunction with the high-level diagram. What commands are included in the extended command set depends on the graphical notation specification, the basic command set provided by the diagramming tool, the intelligence of the underlying low-level process engine, and a variety of other factors. In one embodiment, the extended command set includes commands such as set watchpoint, stop, resume, continue, suspend, check value, finish, etc.

In one implementation, the extended command set allows a user to set breakpoints. To debug a process, it is useful to be able to set breakpoints at certain points during the process. Breakpoints suspend the running process and allow a user to check the status and/or value of various variables and parameters and look at the underlying code. For instance, using the debugging tool 105 a user sets a breakpoint on a high-level graphical diagram associated with a running low-level process. When the process reaches the breakpoint, the debugging tool pauses or suspends the low-level process so the user can verify the process is in the correct state and troubleshoot it if it is not.

In one implementation, the debugging tool 105 allows the user to input commands to control process execution. For example, the debugging tool adds user interface controls that allow a user to stop the process, step through the process, suspend it, resume it, etc.

Note that the debugging tool may be implemented in a variety of ways. FIG. 1 illustrates example components that may be part of debugging tool 105. For example, in one implementation, the debugging tool 105 has a debugger 110, event request manager 112, a virtual process engine 120, and an event queue 114. In other implementations, the debugging tool may include other components, fewer components, or a combination thereof.

In one implementation, the low-level process engine 130 is a software tool that executes low-level process code. The low-level process engine 130 receives user input and executes the process based on the received input. In a BPEL implementation, the user input includes SOAP (Simple Object Access Protocol) messages. As it executes, the low-level process engine 130 generates and outputs low-level events. Those are captured by the debugging tool 105. Based on the captured low-level event information, the debugging tool 105 updates the diagram 102 in the diagramming tool 101 to show debug state information.

The debug state information may be as simple as highlighting the current visual element in diagram 102 to show the user where the process is at, or it may include more sophisticated debug information such as parameter values, low-level lines of code, user input, test case information, etc. It should be noted that highlighting a visual element may include changing the color of the object, making it larger or smaller, changing the font type or font size, using a shadow effect, distorting it, or using some other means to visually distinguish an object from others on the screen.

Alternatively, a different set of tools, modules, classes, or applications may be used to implement the framework, or a combination thereof may be used.

BPMN and BPEL Environment

The techniques described herein are often described in terms of a BPMN and/or BPEL environment. Note that these environments are meant only to serve as exemplary environments in which the techniques of the present invention are employed. In alternative implementations, the techniques may be employed in other environments.

I. BPMN Diagram

Figure 2:
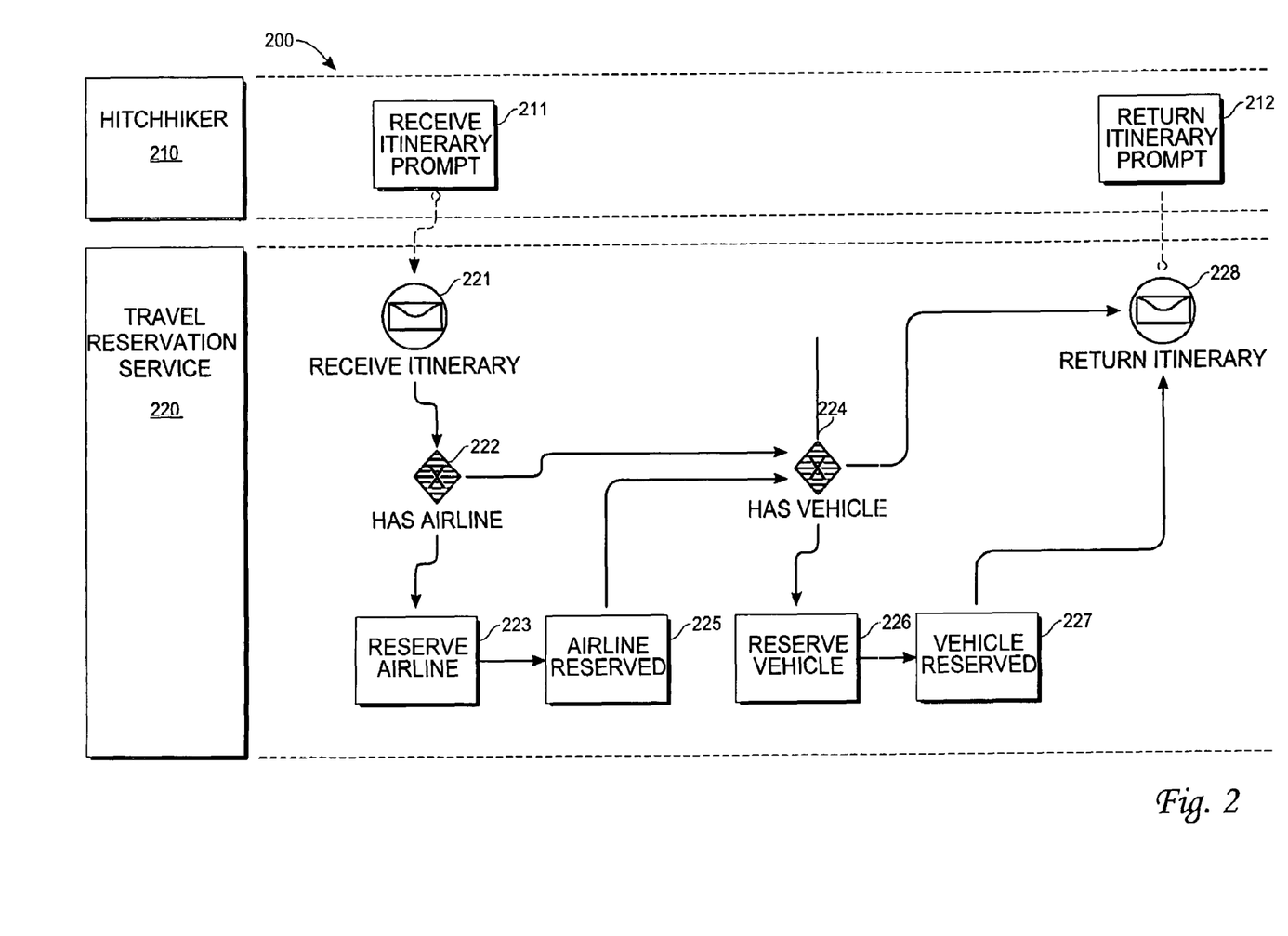
FIG. 2 illustrates an example BPMN diagram.

FIG. 2 illustrates an exemplary graphical notation diagram 200 that may be created by a user using a diagramming tool, such as diagramming tool 101 described in connection with FIG. 1. More specifically, FIG. 2 illustrates a BPMN diagram representing a business workflow for creating travel itineraries.

Features of BPMN are well-known so they are not discussed at much length herein. However, a simple overview of some of the concepts of BPMN may be useful to understand FIG. 2.

In the BPMN specification, a BPMN pool defines who the parties are in a business transaction. Within the context of a BPMN pool, services and activities provided by a party are illustrated in terms of three core types of visual elements: events (shown as circles); tasks (shown as rectangles); and gateways (shown as diamonds). These three core types of visual elements are connected using flow objects. Flow objects are solid, dashed, arrowed, and other types of lines showing how the process flows. For example, a solid arrow line is used to show the sequence in which tasks are performed. Similarly, a dashed line shows the flow of messages between two partners.

In FIG. 2, the BPMN diagram 200 shows a business process for creating a travel itinerary. Accordingly, the BPMN diagram illustrates two distinct pools: the hitchhiker pool 210 and travel reservation service provider pool 220. These two pools represent the two main parties involved in the business process. Hitchhiker 210 communicates with travel reservation service provider 220 in order to reserve an airline ticket and/or rent a car.

Within each pool a number of BPMN tasks have been defined. For example, in the hitchhiker pool, there are two defined tasks: receive itinerary prompt 211 and return itinerary prompt 212. The travel reservation service pool 220 includes the following pertinent tasks: reserve airline 223, airline reserved 225, reserve vehicle 226, and vehicle reserved 227.

These tasks define the actions performed by each party during the process. For example, receive itinerary prompt 211 represents a user being queried for itinerary information. The user inputs the destination, date, time, and other information to reserve a seat on an airplane. The itinerary message is then sent from the hitchhiker to the travel reservation service 220. The travel reservation service 220 receives the message at receive itinerary 221 event and begins the processing the message. For example, at the travel reservation service 220, the itinerary input is analyzed to extract requested reservation information. If the travel reservation service 220 determines that user has requested an airline reservation 222, it attempts to reserve an airline seat for the user at the reserve airline 223 task. Upon successfully reserving the airline seat 225, the travel reservation service 220 then determines whether the user requested a vehicle reservation 224. If so, the travel reservation service 220 performs the reserve vehicle 226 task.

After completing the reserve vehicle 227 task, an updated itinerary 228 is sent back to the hitchhiker 210. The return itinerary is displayed to the user 212. In one implementation, the return itinerary describes the success or failure of the process to reserve an airline seat and a car rental. Alternatively, it provides prompts for additional information.

In other BPMN diagram implementations, the BPMN diagram may be more complex.

In one implementation, a debugging tool, such as debugging tool 105 in FIG. 1, extends the capabilities of the diagramming tool so breakpoints and other debug information may be added to a high-level graphical notation diagram. For example, in FIG. 2, two breakpoints have been inserted for debugging purposes. The breakpoints are set at gateways 222 and 224. The breakpoints, in FIG. 2, are denoted by highlighting gateways 222 and 224. In other implementations, breakpoints and other debug information set by a user may be indicated by different color schemes, enlarging the visual element, or using some other approach to identify debug information.

It should be noted that setting breakpoints and additional debug information may add new elements to the structure of the high-level diagram. To handle the additional objects, the diagramming tool is extended to recognize those features. Accordingly, in one implementation, the diagramming tool has knowledge of a breakpoint (in the sense that it recognizes it as a valid object), however, the diagramming tool does nothing with it.

Furthermore, in one implementation, breakpoints and request for other debug information may be added to any visual element defined in a diagram. Alternatively, constraints may be placed on which visual elements may have debug information added.

Once a high-level graphical notation diagram has been created, there are standard translator tools that convert the high-level graphical notation diagram into low-level process code. Referring again to FIG. 1, after the user has completed a BPMN diagram using diagramming tool 101, the finished diagram is sent to a translator tool (not shown) that converts the diagram into BPEL-defined XML documents that sets forth the illustrated flow. In some implementations, because breakpoints and other debug information may be present in the high-level diagram, the translator tool may also be extended to recognize the debug information as valid elements. Or, alternatively, the breakpoints and other debug information may be handled opaquely by the translator tool.

In one implementation, the translator tool is part of the diagramming tool. Alternatively, it is an extension to the diagramming tool.

After the high-level graphical notation diagram has been converted into instructions for a low-level process engine, the code is executed by a low-level process engine.

II. BPEL Engine

Referring again to FIG. 1, the debugging framework includes low-level process engine 130 to execute generated low-level process instructions. In one implementation, the low-level process engine 130 is a BPEL engine. While the BPEL engine executes the instructions, debugging tools provide the interfaces to the BPEL engine that allow a user to debug the running process. For example, in one implementation, a BPEL engine is designed to receive user input and to output debug information. A debugging tool leverages these capabilities to capture low-level debug events output from the BPEL engine and to send input commands to control the BPEL engine's runtime environment.

It should be noted that most BPEL engines 130 have some debugging capabilities at a very low-level. For instance, a BPEL engine may look for BPEL grammar inconsistencies or invalid reference within the BPEL code. However, the BPEL engine alone does not have the capability to debug the running process using high-level diagram tools. In fact, the BPEL engine is unaware of the high-level BPMN diagrams and the debugging tool.

In one implementation, a BPEL engine receives BPEL documents and executes them. As the process executes, decision points and service providers look at the BPEL documents in order to decide what to do. To help guide the process, user input may be received through SOAP messages or other documents.

Consider, for example, the BPMN diagram 200 described in connection with FIG. 2. Assume a set of BPEL instructions corresponding to the BPMN diagram is input into BPEL engine 130. The BPEL engine 130 executes them. During execution, the BPEL engine encounters instructions corresponding to each of the visual elements shown in the BPMN diagram 200. The BPEL engine executes the code and outputs low-level debug events based on the requests and parameters set by the user on the diagram. For example, when the BPEL engine processes instructions corresponding to gateway 222, which has a breakpoint set on it, the BPEL engine generates and outputs a low-level breakpoint event.

In one implementation, a debugging tool is listening for the low-level debug events. When the low-level breakpoint event is output, the debugging tool captures it and uses the event to help debug the process at the BPMN diagram level as described herein.

III. Debugging Tool

In FIG. 1, debugging tool 105 interacts with the diagramming tool 101 and a low-level process engine 130. In one implementation, the debugging tool is an extension of the diagramming tool. In this implementation, users may switch back and forth between a debugging mode and a diagramming mode. Such switches are transparent to the diagramming tool and any associated low-level process engines.

The debugging tool provides users with techniques and tools to set debug event requests, step through the process, check the state of the process during execution, and troubleshoot the process. Basically, the debugging tool 105 allows users to control the debugging environment. For instance, a user can suspend or resume running BPEL threads, set breakpoints, set tracepoints, set watchpoints, receive notification of exceptions, observe classes, create threads, inspect a thread's state, evaluate local variables, perform a stack backtrace, etc.

In one implementation, the BPMN diagramming tool does not need to be aware of any debugging capability except for the ability to set breakpoints and other supported debug state information on the visual elements in a BPMN diagram.

Once debug events have been added to the diagram and the process is in debug mode, the debugging tool 105 listens for output from a low-level process engine, captures it, and uses that information to debug the running process.

The debugging tool 105 may include various components, such as a debugger 110, event request manager 112, virtual process engine 120, and event queue 114, to facilitate the debugging process. In alternative implementations, other components or features, or combinations thereof may be used to debug a process.

A. Debugger Component

In one implementation, the debugging tool 105 has a debugger component 110. The debugger 110 is the component of the debugging tool 105 that interfaces directly with the diagramming tool 101. For instance, when the diagramming tool is switched to a debug mode or the debugging tool is launched in some other way, the debugger 110 analyzes the BPMN diagram 102 and extracts visual elements 103 from it. Furthermore, the debugger 110 determines if the user has associated debug events with any of the visual elements 103 in the diagram 102.

For each visual element 102 extracted from the diagram 102, in one implementation, the debugger 110 creates a virtual flow element 111. Each created virtual flow element 111 is an instance of a wrapper class object. A virtual flow element 111 is independent of any particular BPEL or BPMN implementation; therefore, it can be passed to the various components of the debugging tool 105 regardless of the implementation-specific details. Some of the basic features of a virtual flow element may include a set of constants or variables to determine what debug information has been set for a particular visual element (e.g., the virtual flow element may include a SetBreakPoint variable to indicate whether a breakpoint has been set), methods and interfaces to create and register breakpoints and other debug events with an event request manager 112, parameters to store the name of the visual element, and other such features.

The debugger 110 generates a virtual flow element including any additional features based on information set at its corresponding visual element. For example, if a user has set a breakpoint on visual element 103, the debugger 110 detects the breakpoint and sets a SetBreakPoint value to "True" in the corresponding virtual flow element 111. By doing so, later analysis of the virtual flow element yields the fact that the encapsulated visual element has a set breakpoint.

Moreover, in one implementation, the debugger 110 assigns a tag identifier to a virtual flow element 111. The tag identifier may be assigned to the virtual flow element (e.g., randomly, as the product of a hash table, sequential numbering, etc.), or, alternatively, the tag identifier is simply the name of the underlying visual element. The tag identifier provides a way to match low-level debug events to those debug events set by the user.

After a virtual flow element 111 has been created, the debugger 110 registers the virtual flow element with the event request manager 112.

It should be noted that in some implementations, visual elements 103 are not encapsulated in the virtual flow element wrapper class. Instead, the visual elements are forwarded directly to the event request manager 112. In yet other implementations, only visual elements associated with particular types of debug events are wrapped, for instance, only those visual elements with an associated breakpoint.

B. Event Request Manager

In one implementation, the event request manager 112 is a software component of debugging tool 105 as illustrated in FIG. 1. Event request manager 112 determines on which elements from a BPMN diagram a user has requested debug events and generates a list of those event requests. In alternative implementations, the event request manager 112 is a part of the virtual process engine 120. Or, it may be part of the debugger 110.

In one implementation, the event request manager 112 receives a virtual flow element 111 and from it, generates an event request 113. An event request, like a virtual flow element, may be a wrapper class object that, in one implementation, is independent of any particular BPMN or virtual process engine implementation. Alternatively, an event request may simply be an entry in a hash table or array that maintains the name of a visual element/virtual flow element and the debug events associated with the element. In one implementation, each event request is associated with a corresponding virtual flow element.

The type of event requests that may be made varies from one implementation to the next. For example, in one implementation, the event request manager 112 may have the capability to service requests for breakpoints, tracepoints, step event requests, show value requests, and a number of other debug event requests. When the event request manager 112 creates an event request 113, the event request is added to the set of pending event requests. The set of pending event requests may be maintained as an array, list, stack, table, or some other searchable structure that provides a way for event requests to be identified. In one implementation, the set of pending event requests maintains only those event requests that have a particular type of debug event associated with them. In other implementations, separate sets are maintained for each separate type of event request.

In one implementation, the event request manager 112 services two types of event requests: breakpoint event requests and step event requests. The two types of event requests may be implemented as separate object classes, or alternatively, a generic event request class with associated flags to distinguish the type of event request. A breakpoint event request includes a user-inserted request that at a certain point in the diagram the low-level process stop running, without exiting or terminating the process. When a process enters into a breakpoint state a variety of information may be displayed, examined, and even modified. For example, source code may be viewed, variable values updated, etc. A step event request on the other hand is a device created to make the debugging process easier to follow. For example, by defining a step event for those visual elements without a breakpoint provides a mechanism for users to visually see the process move from one visual element to the next. In one implementation, step events are ignored, and the running process only stops when a breakpoint event request is encountered.

In one implementation, the step event pauses the running process so the high-level diagram can be updated. Alternatively, step events are placed in a queue, while the underlying low-level process code is executed. Once a breakpoint is reached the step events are removed from the queue and processed.

In one implementation, assume that a generic event request class is used to designate both breakpoint event requests and step event requests. To add a breakpoint event request and step event request to the set of pending event requests, the event request manager 112 has at least two pre-defined interfaces, CreateStepEventRequest and CreateBreakpointEventRequest, which create the proper event request 113 for a virtual flow element 111 and adds the event request to the set of pending event requests.

It should be noted that in some implementations only certain types of virtual flow elements are made into event requests. For example, in one implementation, only virtual flow elements with a breakpoint flag set to "True" are converted into event requests. Alternatively, each virtual flow element 111 has a corresponding event request 113.

Assuming that each virtual flow element has a corresponding event request, in one implementation, a step event request is a default type of event request made in connection with virtual flow elements 111. By making step event request the default for each virtual flow element, a step event request is registered for every visual element in a diagram. Later, during the debugging process, having a registered step event request for each element allows the user to step through the high-level diagram.

In an alternative implementation, if a user has not set a debug event on a visual element, the visual element (or its corresponding virtual flow element) is simply ignored by the event request manager 112.

The event request manager 112 maintains the set of pending event requests, so that when the virtual process engine detects a low-level debug event from the underlying low-level process engine, a look-up can be performed to see if there is a matching event request located in the set of pending event requests. Once the set of pending event requests has been generated, the BPEL process starts running.

C. Virtual Process Engine

The virtual process engine 120 provides an interface between the other components of the debugging tool 105 and the BPEL engine 130. Since there are a number of currently available BPEL engines, the implementation of a virtual process engine varies based on the BPEL engine it interfaces with.

In one implementation, the virtual process engine 120 listens for low-level debug events from the BPEL engine as it executes process instructions. When the virtual process engine 120 detects a low-level debug event, it captures the output event, pauses the BPEL engine (if necessary), and gathers requested debug state information from the runtime environment.

In one implementation, the low-level debug events include breakpoint events, step events, exceptions, and other types of testing information. In some implementations, additional information such as the current line number in the BPEL source code can also be passed from the low-level process engine to the debugging tool 105.

After the virtual process engine 120 captures the output event, it performs a look-up to see if the event request manager 112 has an event request 113 for the captured low-level debug event. In one implementation, the look-up involves extracting a tag identifier from the low-level debug event and using the tag identifier to see if there is a matching event request in the set of pending event requests maintained by the event request manager 112. For example, referring to FIG. 2, the extracted tag identifier is "receive itinerary prompt", which corresponds to a pending event request for the BPMN task "receive itinerary prompt" 211.

Consequently, if there is an event request registered for the captured event, the virtual process engine 120 creates an event object 115 for that request. The event object 115 indicates that the virtual process engine 120 captured a low-level debug event and there was a pending event request for it. Therefore, for each event object there can be a corresponding event request associated with the event object.

In one implementation, an event object 115 is a wrapper class object that encapsulates an event request 113. Alternatively, the event object 115 is merely another name for the event request or virtual flow element objects.

The virtual process engine 120 may have the capability to decide whether to skip registered event requests. For example, in one implementation, a user sets only one breakpoint in a very complex high-level diagram. Instead of stepping through the entire process from beginning to end, the user may choose to skip over step event requests and only pause when the breakpoint event request is encountered. Accordingly, when the virtual process engine encounters a step event request, it ignores it and continues processing. In one implementation, the user defines how certain types of events are handled (e.g., whether to skip an event, step through it, etc.).

Once created, an event object 115 is put onto the event queue 114.

Another feature of virtual process engine 120 includes the ability to send control commands to the low-level process engine 130. For example, virtual process engine 120 captures a low-level breakpoint event from the BPEL engine, looks-up the event in the set of pending event requests maintained by the event request manager, and finds an event request for that particular breakpoint. In one implementation, the virtual process engine sends a command to pause the BPEL engine. As a result, the BPEL engine temporarily suspends the running process. Once the debugging tool 105 has analyzed the captured low-level debug event, the virtual process engine 120 sends a resume command to the BPEL engine, and the BPEL engine resumes processing. The set of commands the virtual process engine sends to the BPEL engine may include "pause," "resume," "start," "exit," "continue," "set breakpoint," "step," etc. Alternatively, the virtual process may use a different set of commands or combination of commands.

In one implementation, user commands may be sent to the virtual process engine, which forwards the commands to the BPEL engine. For example, suppose that during debugging, a user has to go to the bathroom and decides to pause the process. From the debugging user interface, the user selects a control to pause the running process. In one implementation, the command is sent to the virtual process engine, and it translates the command (if necessary) and forwards the command to the low-level process engine 130. In this way, a user may pause, continue, start, stop, or step through a process even if no particular event requests have been set. Alternatively, the command is sent directly from the debugger to the BPEL engine.

D. Event Queue

The event queue 112 is a software component of debugging tool 105. It stores pending events until the debugging tool 105 can process them. In one implementation, the event queue is a part of the virtual process engine 120. Or, it may be part of the debugger 110.

When the virtual process engine captures low-level debug events from the BPEL engine, those captured events that have a pending event request are placed in an event queue as described above. In one implementation, the virtual process engine 120 first converts each received low-level debug event into an event object 115, then places the event object on the event queue 114.

In one implementation, the event queue 114 is a queue of event objects 115. In this implementation, the event queue 114 has two methods QueueEvent and RemoveEvent. QueueEvent is called by virtual process engine 120 to place an event object 115 on the event queue 114. RemoveEvent is called by the debugger 110 to remove the event object 115 from the event queue 114.

Alternatively, the event queue 114 is implemented differently.

After an event object 115 is placed in the event queue 114, the debugger 110 is notified. The debugger 110 removes the event from the event queue 114 and evaluates it. Evaluating the event object 115 includes analyzing the event to determine what action to take, removing wrapper class layers until the original visual element is exposed, and updating the high-level diagram to show the debug state information associated with the captured event. Updating the BPMN diagram may include highlighting the visual element associated with the current debug state information.

In one implementation, assume the debugger 110 evaluates an event from the event queue. In this example, as discussed above, the event is associated with an underlying event request. The event request is in turn associated with a virtual flow element, which in turn identifies an associated visual element. Note that in this example the relationships between these four items (e.g., event, event request, virtual flow element, and visual element), no matter how they are represented in the framework, maintain a direct connection to the original visual element. Thus, in one embodiment, updating the visual element in the BPMN diagram involves unwrapping each item until the visual element is exposed.

For instance, to update the BPMN diagram, the debugger 110 removes event class information from the event object to expose the underlying event request. The event request information is then removed to retrieve a virtual flow element object associated with the original visual element. Finally, the debugger 110 removes the virtual flow element information to expose the original visual element. The debugger 110 may then instruct the diagramming tool to update the BPMN diagram.

IV. Workflow Example

To further illustrate techniques for debugging a low-level process using a high-level graphical notation diagram, assume a user creates BPMN diagram 200 shown in FIG. 2. As discussed above, FIG. 2 illustrates a workflow process for booking a vacation through a travel reservation service 220. BPMN diagram 200 includes a number of BPMN visual elements and two user-defined breakpoints at gateways 222 and 224. In the example, BPMN diagram 200 was created using diagramming tool 101 described in connection with FIG. 1.

At some point after the BPMN diagram is complete, the user converts it to BPEL code using a BPMN-to-BPEL translator tool that understands debug objects, such as breakpoints. The resulting BPEL instructions model the workflow illustrated in the diagram 200.

After converting the diagram into BPEL code, in one implementation, the user switches the diagramming tool into a debug mode. As the diagramming tool switches to debug mode, in one implementation, the user is prompted to import test case information, thus, avoiding the need for external prompts for user input. Alternatively, test case information is entered manually.

In another implementation, the BPMN diagram is exported and opened in a separate debugging tool application.

A. Startup

When debugging tool 105 is launched, it evaluates whether the user has set debug events on any of the visual elements in the diagram 200. In one implementation, the debugger component 110, described in connection with FIG. 1, performs this analysis.

For example, when the user switches the BPMN diagramming tool 101 to a debug mode, the debugger component 110 of the debugging tool 105 evaluates the BPMN diagram 200. Evaluating the BPMN diagram 200 involves extracting each of the visual elements (e.g., elements 211, 221, 222, 223, 224, etc) and determining whether the user has set debug events on any of the visual elements. During the analysis, in this example, the debugger 110 determines that two breakpoint events have been set at gateways 222 and 224.

In one implementation, the next step the debugger 110 takes is to create the virtual flow elements 111 described in connection with FIG. 1 for each visual element. For example, during its analysis, the first visual element the debugger 110 encounters is the "receive itinerary prompt" element 211. The debugger 110 generates a virtual flow element for the receive itinerary prompt element 211, extracts information about the visual element from the diagram, and inserts the information into the newly-created virtual flow element. For example, a resulting virtual flow element may include a tag identifier and other information to indicate if a debug event, such as a breakpoint, was set.

In this example, it is assumed that each of the visual elements includes at least a step event request. Accordingly, the resulting virtual flow element for the receive itinerary prompt 211 includes the underlying visual element, an interface to create a step event request, a tag identifier, and possibly other information. The newly-generated virtual flow element is then passed to event request manager 112 as described in connection with FIG. 1.

The debugger 110 then proceeds to evaluate the other visual elements in the diagram 200. For example, the next visual element evaluated is the receive itinerary element 221. The debugger 110 evaluates it in essentially the same way that the receive itinerary prompt 211 was analyzed. In the end, the debugger creates a virtual flow element 111 with a tag identifier corresponding to visual element 221.

Next, the debugger evaluates gateway 222, which has a breakpoint event set on it. Here, the evaluation process remains substantially the same, except, the resulting virtual flow element includes an interface to create a breakpoint event request. The virtual flow elements for visual element 211 and 221 do not have that interface. In addition, the virtual flow element for gateway 222 may include other changes, such as a breakpoint flag set to "True."

After processing gateway 222, the debugger 110 proceeds to evaluate the other visual elements 223-228 in a substantially similar manner. In the end, the debugger 110 generates a set of virtual flow elements corresponding to the visual elements in BPMN diagram 200. The newly-created virtual flow elements are forwarded to an event request manager. There, the virtual flow elements are registered as event requests.

In one implementation, the visual element is forwarded directly to an event request manager without the virtual flow element wrapper overhead.

Alternatively, a different component or combination of components may perform the analysis.

B. Register the Requests

Event request manager 112, described in connection with FIG. 1, maintains a set of pending event requests 113. The event request manager 112 receives virtual flow elements 111 from the debugger 110 and creates event requests 113 for them. As the event requests are created, they 113 are added to the set of pending event requests. The set of pending event requests, basically, represents requests to listen for specific low-level debug events as they are output by the BPEL engine.

In this example, it is assumed that the user can only set two types of event requests: breakpoint event requests and step event requests. Accordingly, if a virtual flow element has a breakpoint associated with it, a breakpoint event request is created and placed in the set of pending event requests. If there is no breakpoint associated with the virtual flow element, a step event request is created.

In one implementation, an event request is created for each received virtual flow element. The reason for registering every virtual flow elements is to provide users with the ability to step through each portion of a BPMN diagram. In some cases where the user does not want to visually step through the BPMN diagram, only breakpoint event requests are registered.

Once all of the virtual flow elements have been registered as event requests by the event request manager 112, a command is sent to the BPEL engine to start executing the low-level process code. In one implementation, the user selectively chooses where in the diagram the debugging tool begins evaluating code. For example, in FIG. 2, the user may select the Airline Reserved 225 visual element as the starting point for debugging the illustrated business process.

C. Debug the Code

Once the BPMN diagram 200 has been analyzed and the appropriate event requests 113 have been registered, a BPEL engine 130 executes the BPEL code. During execution, the debugging tool 105 provides various techniques for troubleshooting the running process.

The first code executed by the BPEL engine is code associated with receive itinerary prompt 211. Prompts for itinerary information are automatically filled with imported test case information. As the BPEL code executes, a virtual process engine 120, as described in connection with FIG. 1, listens for low-level debug events output by the BPEL engine.

While the code for receiving itinerary prompt 211 is running, the BPEL engine outputs a low-level step event. In some implementations, the BPEL engine also outputs other information, such as the visual element identifier (so that the low-level step event can be associated with pending event requests), source code line number, test case information, exceptions, etc. This information is captured by the virtual process engine 120. In one implementation, the virtual process engine sends a command to the BPEL engine to pause the running process, while the output is evaluated. Alternatively, the BPEL engine continues processing and places any subsequent detected low-level debug events on an event queue. In this way, each low-level debug event is still evaluated in turn. In some implementations, the BPEL engine pauses on its own when a low-level debug event occurs.

Assume, in this example, that the running process has been paused. As it relates to receive itinerary prompt 211, the virtual process engine processes the received low-level step event and performs a look-up to see if there is a registered event request 113 corresponding to it. In one implementation, the look-up is performed by comparing identification information retrieved from the low-level step event with identifiers stored in the set of pending event requests. If the virtual process engine 120 does not find a match for the low-level step event among the set of pending event requests, the captured step event is ignored and the debugging tool tells the BPEL engine to continue.

If the low-level step event matches an event request 113 registered by the event request manager 112, the virtual process engine 110 generates an event, places the event in an event queue, and waits for the event to be processed. In this example, when the virtual process engine compares the low-level step event for receive itinerary prompt 211 to the set of event requests maintained by the event request manager, it detects a match. Accordingly, an event object 115 for the receive itinerary prompt 211 is created and placed in the event queue 114. The debugger 110 is notified that an event 115 is pending in the event queue 114, and, consequently, the event is removed from the queue and processed.

The actual processing of the event varies based on a variety of factors. In one implementation, the user may selectively decide how an event is processed. For example, the user set preferences to highlight a particular visual element as the corresponding BPEL code is executed. In addition, the user may decide to display other debug state information with each step event to ensure correct values are being passed from one component to the next. In other implementation more or less information may be displayed.

In this example, one of the results of processing an event includes highlighting the corresponding visual element. Thus, when the debugger 110 detects the event associated with receive itinerary prompt 211, it causes the visual element 211 in the diagram 200 to be highlighted. Other debug state information is displayed as determined by a user.

After the event 115 associated with visual element 211 has been processed, in one implementation, the user is prompted to step to the next visual element 221 in the BPMN diagram. In some implementations, the user may be presented with additional options. For example, the user may be presented with the option to skip all step events, to skip a certain number of steps, to exit debug mode, etc.

The user chooses to step to the next visual element 221 and the debugger 110 tells the BPEL engine to resume executing the BPEL code.

The BPEL engine 130 processes the code associated with Receive Itinerary 221. Again, a low-level step event is output by the BPEL engine 130. The virtual process engine 120 captures the low-level step event, determines that there is a corresponding step event request registered for Receive Itinerary 221, creates an event, and adds the event to the event queue. The debugger 110 processes the event and the BPMN diagram 200 is updated. For example, at this point, the debugger 110 switches receive itinerary prompt 211 from a highlighted state to an un-highlighted state. Then, the debugger 110 highlights receive itinerary 221. As before, the BPMN diagram 200 may also be updated with debug state information.

After the event has been processed, the user is again prompted to step to the next visual element in the diagram. The user chooses to step to the next visual element.

Here, the BPEL engine 130 executes code associated with gateway 222.

At gateway 222, the user has set a breakpoint. When the low-level process code associated with gateway 222 is executed, the BPEL engine 130 outputs a low-level breakpoint event. The low-level breakpoint event is captured by the virtual process engine 120. In one implementation, the BPEL engine receives a command from the virtual process engine 120 to suspend execution.

The virtual process engine 120 sends a look-up request to the event request manager 112 to see if an event request exists for the captured low-level breakpoint event. As mentioned above, a breakpoint event request was generated and registered for gateway 222. Therefore, the virtual process engine 120 finds a match.

Once a matching request for the low-level breakpoint event has been identified, the virtual process engine 120 creates an event object 115 and adds it to the event queue 114. As before, the debugger 110 is notified that an event has been queued. The debugger 110 removes the event object 115 from the event queue 114, and, in one implementation, unwraps the various wrapper layers from the event object 115 (e.g., it unwraps the event, unwraps the event request, and unwraps the virtual flow element from the visual element). After the debugger 110 unwraps the gateway visual element 222, the debugger updates the diagram with breakpoint state information. Breakpoint state information typically includes more debug state information than would be listed with a step event. For example, in the case of a breakpoint event, the underlying source code may be displayed, lines numbers associated with the code, additional variable values may be displayed, the next step that in the process may be displayed, the user may change parameter values, test case input, prompt the debugger to restart from the beginning, step back to a prior visual element, and other such information. In one implementation, a user pre-selects what information should be displayed at a breakpoint. In another implementation, the user may request more debug information at after reaching the breakpoint. In this way, the user checks the integrity of passed information, checks for logic errors in the code, and performs other diagnostics.

In one implementation, by placing a breakpoint at gateway 222, a user is able to verify the path the workflow in BPMN diagram 200 follows. For example, if the input indicates that the user already has an airline booked, then the BPEL process should proceed to the next gateway 224. If the user does not have an airline reservation, the next set of BPEL code processed by the BPEL engine 130 should be code associated with reserve airline 223.

In this example, it is assumed that the test input indicates that an airline has already been booked. If there is a problem in the breakpoint state information, the user may set additional breakpoints, request additional debug information, and/or restart the debugging process. When the user finishes troubleshooting the breakpoint, the user asks the debugger 110 to continue to the next stage in the process. Consequently, the debugger 110 sends a resume command to the virtual process engine 120, which in turn asks the BPEL engine 130 to resume the running process. As the process starts again, it should bypasses visual elements 223 and 225, since, assuming the process has been properly troubleshoot, an airline flight is already booked.

Then, the BPEL engine 130 proceeds to execute code associated with gateway 224. The BPEL engine 130 eventually issues a low-level breakpoint event for gateway 224. The low-level breakpoint event is captured by the virtual process engine 120. As before, the virtual process engine 120 checks to see if there is a breakpoint event request 113 for gateway 224 registered at the event request manager 112. In this case, there is, so an event object 115 is created for the breakpoint event request 113. The event object 115 is put on the event queue 114, and it is processed as described above.

At gateway 224, if the user verifies that the workflow is executing properly and that the appropriate values and parameters are properly set, then the user observes may choose to skip the rest of the steps (since there are no more breakpoints in the diagram). In one implementation, this is done by issuing a continue command from the debugger 110 to the virtual process engine 120. A continue command simply tells the virtual process engine 120 to ignore low-level step events.

Alternatively, the user resumes process execution and finishes stepping through the remaining visual elements 226, 227, 228, and 212. For example, if the user does not have a vehicle reservation, then the workflow proceeds to reserve vehicle 226 to reserve the vehicle and create a confirmation notice at vehicle reserved 227. The BPEL engine processes the code for reserve vehicle 226, which outputs a low-level step event. The low-level step event is processed in the manner described above. Eventually, the user is prompted to step to the next visual element 227. If the user chooses to continue stepping through the BPMN diagram, the techniques described above are repeated for vehicle reserved 227, return itinerary 228, and return itinerary prompt 212.

V. Hardware Overview

Figure 3:
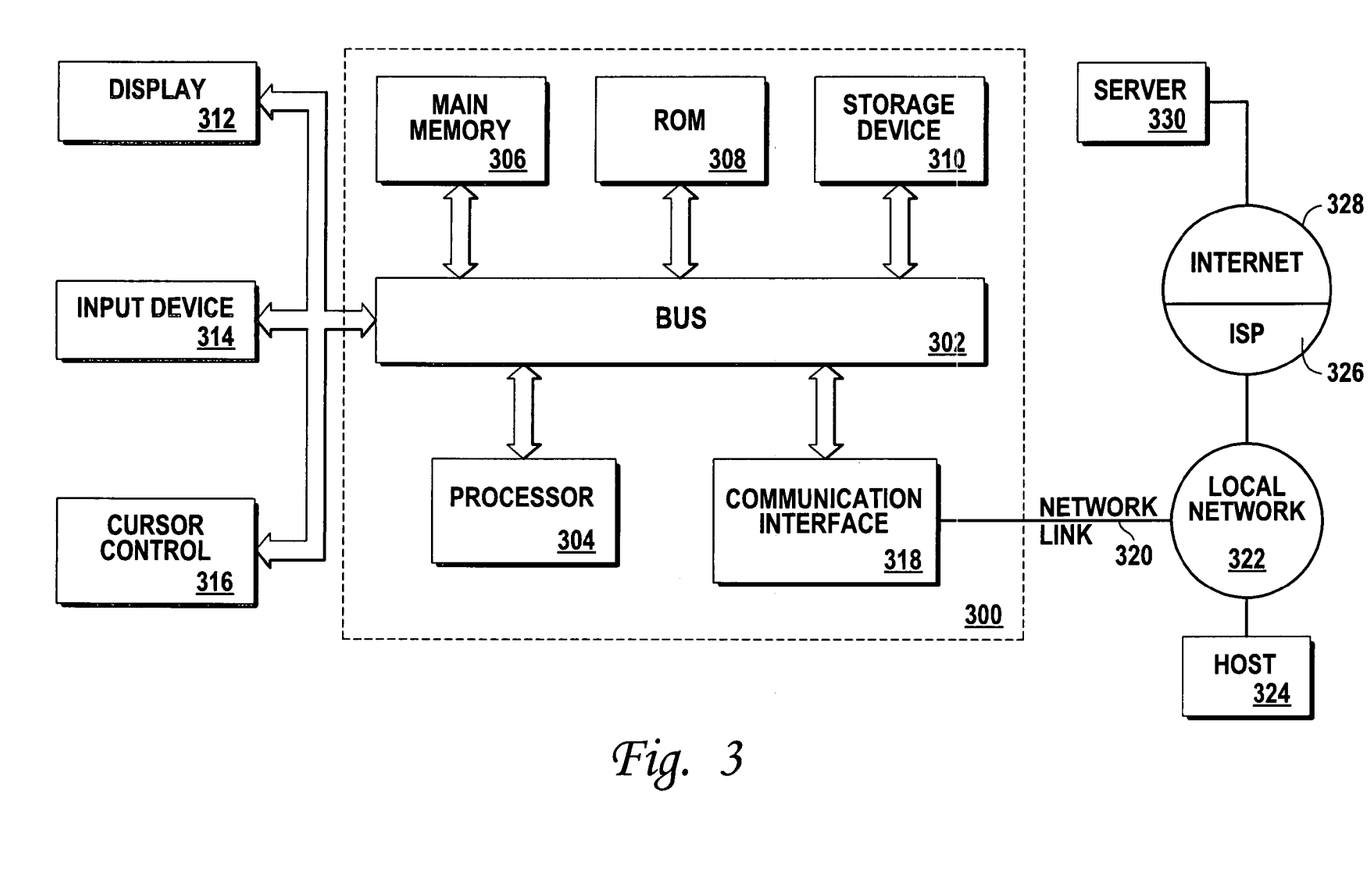
FIG. 3 is a block diagram of a computer system on which implementations of the present invention may be implemented.

In one embodiment, the debugging tool 105, the diagramming tool 101, and the low-level process engine 130 may take the form of sets of instructions that are executed by one or more processors. If they take the form of sets of instructions, FIG. 3 shows a block diagram of a computer system 300 upon which these sets of instructions may be executed. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may further be a network connection that connects one or more of the components. Any mechanism and/or medium that enables information, signals, data, etc., to be exchanged between the various components may be used as bus 302.

Bus 302 may also be a combination of these mechanisms/media. Further, processor 304 may communicate with ROM 308 capacitively. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine-implemented method for debugging a low-level process comprising:

obtaining a graphical notation diagram representing a specific function or feature in the low level process, wherein the graphical notation diagram comprises one or more graphical elements;

setting one or more high-level debug events on the one or more graphical elements in the graphical notation diagram;

converting the graphical notation diagram into low-level code after setting the one or more high-level debug events, wherein the low-level code comprises one or more low-level debug events corresponding to the one or more high-level debug events;

generating a set of pending event requests for the one or more high-level debug events, wherein the set of pending event requests are to listen for the one or more low-level debug events;

initiating execution of the low-level code to generate a low-level debug event;

detecting, during execution of the low-level code, an output of the low-level debug event;

comparing the output of the low-level debug event with the set of pending event requests including a specific event request;

matching the output of the low-level debug event to the specific event request; and updating the graphical notation diagram with breakpoint state information in response to a positive matching result of the output to the specific event request, wherein the graphical notation diagram is a business process modeling notation (BPMN) diagram, and wherein the low-level process is a business process execution language (BPEL) process.

2. The machine implemented method of claim 1, wherein updating the graphical notation diagram includes changing the appearance of a graphical element in the graphical notation diagram that is associated with the low-level debug event.

3. The machine-implemented method of claim 2, wherein changing the appearance of the graphical element in the graphical notation diagram includes highlighting the graphical element in the graphical notation diagram that is associated with the low-level debug event.

4. The machine-implemented method of claim 1, wherein updating the graphical notation diagram includes displaying a set of instructions from the low-level process.

5. The machine-implemented method of claim 1, wherein the one or more high-level debug events includes at least one breakpoint.

6. The machine-implemented method of claim 5, wherein the one or more low-level debug events include a breakpoint.

7. The machine-implemented method of claim 1, wherein the one or more high level events includes a step event.

8. The machine-implemented method of claim 7, wherein the one or more low-level debug events include a step event.

9. A machine-readable storage medium comprising instructions which, when executed by a processor, cause the processor to debug a low-level process by:

obtaining a graphical notation diagram representing a specific function or feature in the low-level process, wherein the graphical notation diagram comprises one or more graphical elements;

setting one or more high-level debug events on the one or more graphical elements in the graphical notation diagram;

converting the graphical notation diagram into low-level code after setting the one or more high-level debug event, wherein the low-level code comprises one or more low-level debug events corresponding to the one or more high-level debug events;

generating a set of pending event requests for the one or more high-level debug events, wherein the set of pending event requests are to listen for the one or more low-level debug events;

initiating execution of the low-level code to generate a low-level debug event;

detecting, during execution of the low-level code, an output of the low-level debug event;

comparing the output of the low-level debug event with the set of pending event request including a specific event request;

matching the output of the low-level debug event to the specific event request; and updating the graphical notation diagram with breakpoint state information in response to a positive matching result of the output to the specific event request, wherein the graphical notation diagram is a business process modeling notation (BPMN) diagram, and wherein the low-level process is a business process execution language (BPEL) process.

10. The machine-readable storage medium of claim 9, wherein the instructions for causing the processor to update the graphical notation diagram include instructions for causing the processor to change the appearance of a graphical element in the graphical notation diagram that is associated with the low-level debug event.

11. The machine-readable storage medium of claim 10, wherein the instructions for causing the processor to change the appearance of the graphical element in the graphical notation diagram include instructions for causing the processor to highlight the graphical element in the graphical notation diagram that is associated with the low-level debug event.

12. The machine-readable storage medium of claim 9, wherein the instructions for causing the processor to update the graphical notation diagram include instructions for causing the processor to display a set of instructions from the low-level process.

13. The machine-readable storage medium of claim 9, wherein the one or more high-level debug events include at least one breakpoint.

14. The machine-readable storage medium of claim 13, wherein the one or more low-level debug events include a breakpoint.

15. The machine-readable storage medium of claim 9, wherein the one of more high level debug events include a step event.

16. The machine-readable storage medium of claim 15, wherein the one or more low-level debug events include a step event.

\* \* \* \* \*

UNITED STATES PATENT AND TRADEMARK OFFICE
CERTIFICATE OF CORRECTION

| | | |
|---|---|---|
| PATENT NO. | : 7,669,187 B2 | Page 1 of 1 |
| APPLICATION NO. | : 11/387225 | |
| DATED | : February 23, 2010 | |
| INVENTOR(S) | : Peter T. Liu | |

It is certified that error appears in the above-identified patent and that said Letters Patent is hereby corrected as shown below:

Title Page, under Item (75) Inventors, line 2, the Inventor's name "Matthew T. Stevens" should read --Matthew J. Stevens--.

Signed and Sealed this

Thirteenth Day of April, 2010

David J. Kappos
*Director of the United States Patent and Trademark Office*